(12) United States Patent
Sakai et al.

(10) Patent No.: US 9,182,589 B2
(45) Date of Patent: Nov. 10, 2015

(54) ELECTROWETTING DISPLAY STRUCTURES

(71) Applicant: Amazon Technologies, Inc., Reno, NV (US)

(72) Inventors: Toru Sakai, Waalre (NL); Ivar Schram, Weert (NL)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/189,996

(22) Filed: Feb. 25, 2014

(65) Prior Publication Data

US 2015/0241689 A1    Aug. 27, 2015

(51) Int. Cl.
| | | |
|---|---|---|
| *G02B 26/00* | (2006.01) | |
| *G02B 26/02* | (2006.01) | |
| *G02F 1/03* | (2006.01) | |
| *G09G 3/34* | (2006.01) | |

(52) U.S. Cl.
CPC ............ *G02B 26/005* (2013.01); *G02B 26/004* (2013.01); *G09G 3/348* (2013.01); *G09G 3/3433* (2013.01); *G02B 26/007* (2013.01); *G02B 26/02* (2013.01); *G09G 2300/04* (2013.01)

(58) Field of Classification Search
CPC .... G02B 26/005; G02B 26/02; G02B 26/004; G02B 26/007; G09G 3/348; G09G 2300/04; G09G 3/3433; G09G 2300/08; G09G 2310/0262; F02F 1/1339
USPC ......... 359/228, 245, 253, 290–292, 295, 665; 345/60, 64, 72, 690; 257/59, 72, 91
See application file for complete search history.

(56) References Cited

U.S. PATENT DOCUMENTS

| | | | |
|---|---|---|---|
| 7,048,889 B2 * | 5/2006 | Arney et al. ................. | 422/68.1 |
| 7,763,314 B2 | 7/2010 | Dai et al. | |
| 7,813,030 B2 * | 10/2010 | Lo et al. ........................ | 359/295 |
| 8,263,981 B2 * | 9/2012 | Wang et al. .................... | 257/59 |
| 8,416,488 B2 * | 4/2013 | Hayes et al. ................... | 359/290 |
| 8,723,759 B2 * | 5/2014 | Parry-Jones et al. ........... | 345/60 |
| 8,773,744 B2 * | 7/2014 | Liang et al. .................... | 359/228 |
| 8,792,173 B2 * | 7/2014 | Bae et al. ....................... | 359/620 |
| 8,854,717 B2 * | 10/2014 | Kim et al. ...................... | 359/290 |
| 8,854,718 B2 * | 10/2014 | Jung et al. ...................... | 359/290 |
| 8,885,261 B2 * | 11/2014 | Takai et al. .................... | 359/665 |
| 8,896,928 B2 * | 11/2014 | Nakasuga et al. ............. | 359/665 |
| 2009/0153942 A1 | 6/2009 | Daniel et al. | |
| 2009/0257111 A1 | 10/2009 | Heikenfeld et al. | |
| 2012/0154886 A1 | 6/2012 | Heikenfeld et al. | |
| 2013/0141775 A1 | 6/2013 | Yao et al. | |
| 2013/0271816 A1 | 10/2013 | Shim et al. | |
| 2013/0301105 A1 * | 11/2013 | Kim et al. ...................... | 359/290 |

OTHER PUBLICATIONS

The PCT Search Report and Written Opinion mailed May 28, 2015 for PCT application No. PCT/2015/016413, 8 pages.

* cited by examiner

*Primary Examiner* — Loha Ben
(74) *Attorney, Agent, or Firm* — Lee & Hayes, PLLC

(57) ABSTRACT

The subject matter disclosed herein relates to an electrowetting display comprising: a transparent substrate including glass spacers surrounded by recessed regions corresponding to pixel regions, a layer of transparent conductive material on the glass spacers, color filter material in the recessed regions, and a transparent support plate covering the recessed regions and the glass spacers, wherein the transparent support plate includes an electrowetting oil.

20 Claims, 15 Drawing Sheets

ELECTROWETTING DISPLAY STRUCTURES

BACKGROUND

Modern communication devices typically have user interfaces that include high-quality displays (e.g., color, greater than 300 pixels per inch (ppi), 800:1 contrast ratio, and so on). Increased multimedia use imposes high demands on designs of display modules incorporated in these devices. An electrowetting display meets demands of such modern devices and performs well in high ambient light conditions (e.g., in sunlight), has relatively fast video speed, and relatively low power consumption. Accordingly, an electrowetting display can replace a liquid crystal display (LCD) in a number of devices such as mobile phones, handheld computing devices, cameras, and so on.

An electrowetting display includes an array of pixels individually bordered by pixel walls that retain at least a fluid such as opaque oil, for example. Light transmission through each pixel is adjustable by electronically controlling a position of the fluid in the pixel. A process of fabricating an electrowetting display includes a number of steps, a number of which can involve improvements that lead to lower fabricating costs and higher yields.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

DETAILED DESCRIPTION

Overview

Figure 1:
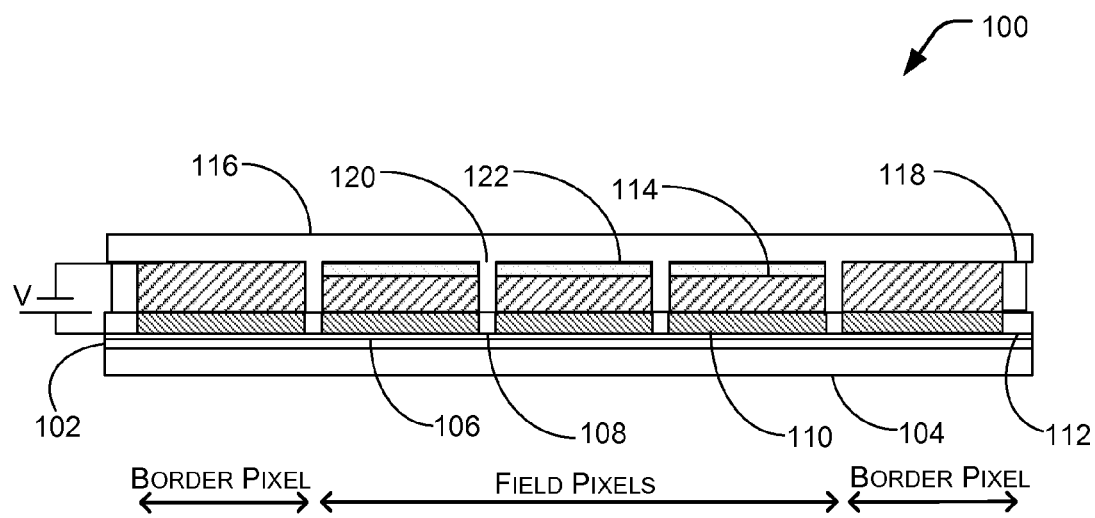
FIG. 1 is a cross-section of an electrowetting display, according to some embodiments.

Electrowetting displays include an array of pixels comprising border pixels and field pixels sandwiched between two support plates, the support plates may include a glass or polymer substrate and may be made of a rigid or flexible material, for example. Border pixels, as used herein, are pixels located on edges of the array of pixels, adjacent to an outer rim of the electrowetting display. Pixels of the array of pixels other than border pixels are field pixels. Individual pixels are surrounded by a pixel wall made, for instance, from photoresist material. Pixel walls retain at least a first fluid which is electrically non-conductive, such as opaque or colored oil, in the individual pixels. A cavity formed between the support plates is filled with the first fluid and a second fluid (an electrolyte) which is electrically conductive or polar and may be water or a salt solution such as a solution of potassium chloride water. The second fluid may be transparent, but may be colored, white, absorbing or reflecting. The second fluid is immiscible with the first fluid. During a process of fabricating an electrowetting display, pixel wall material (e.g., photoresist material) is deposited onto a hydrophobic fluoropolymer layer covering a first glass support plate. Due to the hydrophobicity of this material, the pixel wall material will normally not stick to it. In the fabrication process the fluoropolymer layer is modified to make it less hydrophobic. Such a surface modification can be performed using, for example, reactive ion etching (RIE) or plasma etching or UV Ozone treatment. Accordingly, the pixel wall material will adhere to the modified fluoropolymer layer so that the pixel wall structure can be processed. After deposition of the pixel wall material, however, the hydrophilic property of the modified fluoropolymer layer is no longer desirable. Thus, the hydrophobic property of the modified fluoropolymer layer is restored using, for example, thermal reflow at elevated temperatures. After filling individual pixels with the fluid, a second glass support plate covers the pixels including the pixel wall structure.

In addition to border pixels and field pixels, spacers can also be sandwiched between two clear support plates. Hereinafter, example embodiments are described as including clear support plates that comprise glass support plates. However, support plates can comprise any of a number of transparent amorphous materials, such as plastic, glass, quartz, semiconductors, and so on, and claimed subject matter is not limited in this respect. Herein, describing an element or material as being "transparent" means that the element or material can transmit a relatively large fraction of the light incident upon it. For example, a transparent substrate or layer may transmit more than 70% or 80% of the light impinging on its surface, though claimed subject matter is not limited in this respect. Spacers which mechanically connect a first support plate with a second overlying support plate, or which form a separation between the first support plate and the second support plate, contribute to mechanical integrity of the electrowetting display. Spacers are desirably transparent so as to not hinder throughput of light in the electrowetting display. Transparency of spacers can at least partially depend on the refractive index of the spacer material, which should be similar to or the same as the refractive indices of surrounding media. Spacers are also desirably chemically inert to surrounding media.

In some embodiments, spacers of an electrowetting display comprise glass columns that are formed by etching a glass support plate of the electrowetting display. Such etching recesses regions in the glass support plate while remaining un-etched regions form the glass columns. Etched recessed regions correspond to a cavity region including pixel regions where pixels are subsequently formed, as described below.

Spacers comprising glass offer a number of advantages over spacers comprising photoresist material. For example, glass is much stronger (e.g., rigidity, compressive strength, etc.) than photoresist material, which tends to be relatively elastic. Glass spacers have a refractive index the same as or similar to glass support plates between which the glass spacers are located. Accordingly, glass spacers are substantially invisible since glass spacers do not present any substantial refractive interface to bend transmitting light.

Though directed toward electrowetting display structures, embodiments described herein can also be applied to any of a number of display structures, semiconductor packaging, microfluidic structures, or microstructures that involve a support plate or substrate, for example.

In some embodiments, an electrowetting display as described herein can comprise a portion of a system that includes one or more processors and one or more computer memories. Display software can be stored on the one or more memories and can be operable with the one or more processors to modulate light that is out-coupled from a light guide of the electrowetting display. For example, display software can include code executable by a processor to modulate optical properties of individual pixels of the electrowetting display based, at least in part, on electronic signals representative of image or video data. The code can cause the processor to modulate the optical properties of pixels by controlling electrical signals (e.g., voltages, currents, fields, and so on) on, over, or in layers of the electrowetting display.

Light discussed in embodiments need not be limited to the visible portion of the spectrum. Instead, light can include electromagnetic radiation in any portion of the spectrum, including ultra-violet, visible, and infrared. For example, a display including glass spacers etched out of a glass support plate can operate in any portion of the electromagnetic spectrum.

Illustrative Structures and Processes

FIG. 1 is a cross-section of an electrowetting display 100, according to some embodiments. For sake of simplicity of description, a cross-section of three field pixels and adjacent border pixels are shown. However, an electrowetting display generally includes thousands of field pixels in an array bordered by border pixels. A dielectric barrier layer 102 is formed on a first support plate 104. A hydrophobic layer 106 is formed on dielectric barrier layer 102, which maintains a separation between hydrophobic layer 106 and first support plate 104. Such separation can, among other things, prevent electrolysis occurring through the hydrophobic layer 106. In some implementations, hydrophobic layer 106 can comprise a fluoropolymer, such as AF1600, produced by DuPont, based in Wilmington, Del. Pixel walls 108 form a patterned pixel grid (visible in a top view such as FIG. 2) on hydrophobic layer 106. Pixel walls 108 comprise a photoresist material, such as epoxy-based negative photoresist SU-8.

The patterned pixel grid comprises rows and columns that form a pixel array (e.g., display area) of field pixels and border pixels. For example, a pixel can have a width and length in a range of about 50 to 500 microns. An oil film 110, which can have a thickness in a range of about 1 to 10 microns, for example, overlies hydrophobic layer 106. Oil film 110 is partitioned by pixel walls 108 of the patterned pixel grid. Field pixels include oil film 110, whereas border pixels need not include an oil film. An outer rim 112 can comprise the same material as pixel walls 108. An electrolyte 114 overlies oil film 110 and pixel walls 108 of the patterned pixel grid. A second support plate 116 covers electrolyte 114 and edge seals 118 retain electrolyte 114 over the pixel array. Hereinafter, for sake of convenience, a first support plate, such as first support plate 104, is referred to as a bottom support plate, and a second support plate, such as second support plate 116, is referred to as a top support plate. Unless otherwise noted, a bottom support plate includes, among other things, pixel walls and an oil film, whereas a top support plate includes, among other things, glass spacers and color filters. "Top" and "bottom", as used herein to identify the support plates of an electrowetting display, do not necessarily refer to a direction referenced to gravity or to a viewing side of the electrowetting display.

Glass spacers 120 are located between top support plate 116 and tops of pixel walls 108. In some implementations, color filters 122 are disposed in individual field pixels. Glass spacers 120 comprise an un-etched portion of top support plate 116. In particular, electrolyte 114 and color filters 122 are located in recessed regions etched out of top support plate 116. Voltage is applied between electrolyte 114 (which is in contact with a top electrode in top support plate 116) and an electrode in the bottom support plate 104. A resulting voltage V across oil film 110 and the dielectric barrier layer stack (e.g., comprising dielectric barrier layer 102 and hydrophobic layer 106) of individual pixels can control transmittance or reflectance of the individual pixels.

Figure 2:
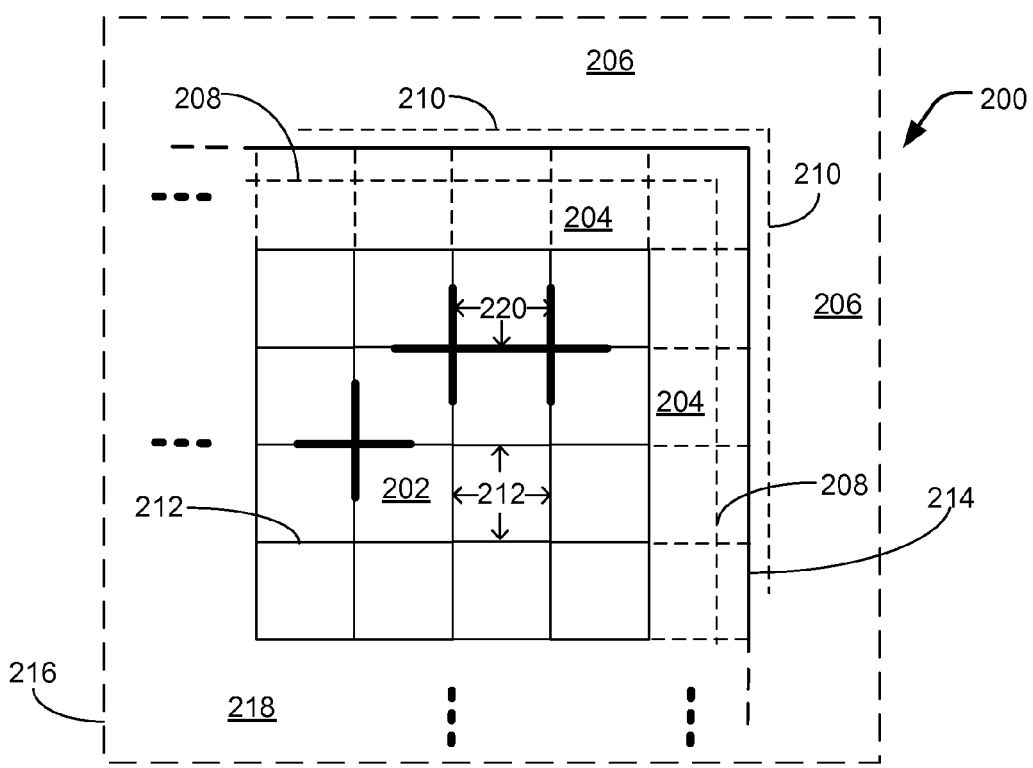
FIG. 2 is a top view of a portion of an electrowetting display, according to some embodiments.

FIG. 2 is a top view of a portion 200 of an electrowetting display, according to some embodiments. For example, portions of the electrowetting display may be the same as or similar to that illustrated in FIG. 1. Portion 200 includes a number of field pixels 202 and border pixels 204. These pixels are surrounded by an outer rim 206. In some implementations, a seal material 208 is located in a region of border pixels 204. Such a seal material can comprise any of a number of polymers and/or adhesives, for example. In alternate implementations, a seal material 210 is located in a region of outer rim 206. Pixel walls 212 surround individual field pixels 202. In some implementations, pixel walls 212 extend from field pixels 202 to an edge 214 of outer rim 206. An underlying bottom support plate 216 is covered with a fluoropolymer layer 218. An overlying top support plate (not shown in FIG. 2) includes glass spacers 220, only a few of which are shown, that extend from the top support plate to at least portions of tops of pixel walls 212. In the example embodiment shown in FIG. 2, glass spacers 220 are cross-shaped having ends that can (but need not) connect to adjacent glass spacers. In other embodiments, glass spacers can be pillar shaped so as to extend from the top support plate to only intersections of tops of pixel walls 212, though claimed subject matter is not limited to any such example configurations of glass spacers In some implementations, border pixels 204 are not functional pixels. In other words, border pixels 204 need not be capable of operating as a display pixel. Accordingly, border pixels 204 need not include oil or an overlying electrolyte (border pixels 204 can nevertheless be filled with oil and electrolyte from the same part of the fabrication process that also fills field pixels 202).

Figure 3:
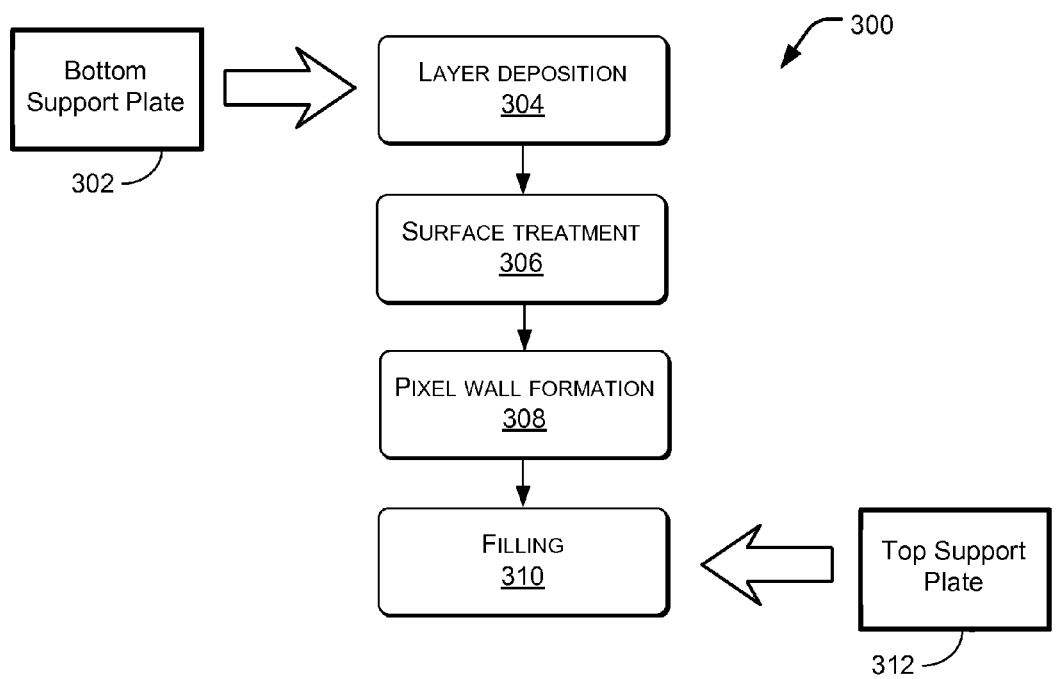
FIG. 3 is a flow diagram of a process for fabricating an electrowetting display, according to various embodiments.

FIG. 3 is a flow diagram of a process 300 for fabricating an electrowetting display, such as electrowetting display 100, according to various embodiments. Process 300 can begin with a bottom support plate 302, which can comprise a transparent glass material coated with indium-tin-oxide (ITO), for example. A barrier layer and a fluoropolymer layer are formed in deposition step 304. Surface treatment step 306 is used to modify the originally-hydrophobic fluoropolymer layer to be hydrophilic so that a photoresist layer can adhere to the fluoropolymer layer. Subsequent to the surface treatment, photoresist can be deposited (e.g., by spin coating) on the fluoropolymer layer in a pixel wall formation step 308 that produces pixel walls and an outer rim that surrounds the pixels of the electrowetting display area. A masking pattern is used to form pixel walls from the photoresist layer.

Subsequent to forming pixel walls and the outer rim, thermal reflow re-establishes the hydrophobic nature of the fluoropolymer layer and cross-links the pixel wall material.

Filling step 310 involves filling pixel recesses (e.g., formed by pixel walls) with oil, covering the oil and the pixel walls with an electrolyte, and placing a top support plate 312 to cover the structure and encapsulate the oil and electrolyte. Top support plate 312 includes glass spacers etched out of top support plate 312. Recessed regions formed in an etching process that formed the glass spacers can include colors filters. The recessed regions (and color filters) are located to correspond to positions of pixels defined by pixel walls formed on the bottom support plate. Seals are formed along a perimeter of the pixels of the electrowetting display area. In particular, the seals are formed on the outer rim that surrounds the pixels or are formed in recessed regions of the top support plate corresponding to border pixels of the bottom support plate. Further details of various processes of forming an electrowetting display are described below.

Figure 4:
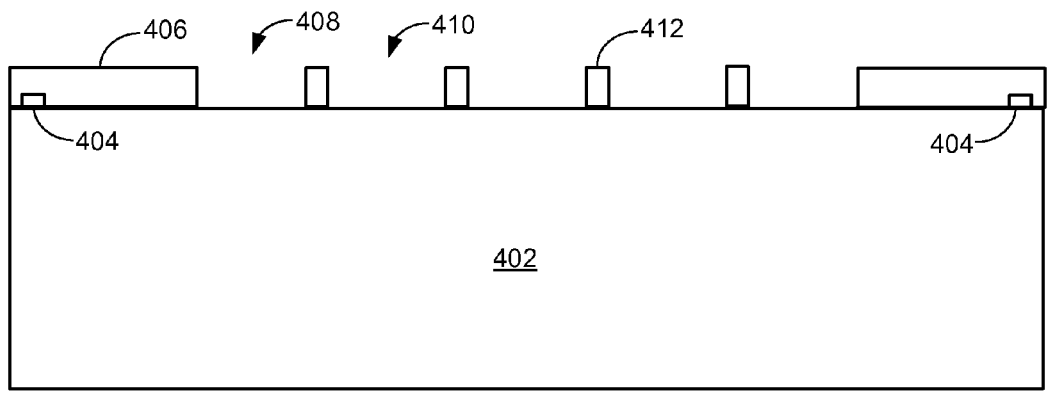
FIGS. 4-25 are cross-section views of a portion of an electrowetting display during various steps of fabrication processes, according to some embodiments.

FIG. 4 is a cross-section view of a substrate used in a process for forming an electrowetting device, according to several embodiments. The substrate comprises a glass support plate 402 from which glass spacers are formed, as described below. Glass support plate 402 is a top support plate that will include glass spacers subsequent to an etching process, shown in FIG. 5. Glass support plate 402 can have a thickness in a range from about 100 micrometers to about 700 micrometers. An etching process to form glass spacers can etch recessed regions to a depth of about 20% or less of the thickness of glass support plate 402. Alignment keys 404 are formed on glass support plate 402 to aid in positioning glass support plate 402 and a corresponding bottom plate in a subsequent step, as described below. For example, alignment keys 404 can be formed using a lithography process involving depositing a metal layer on glass support plate 402, etching the metal layer to form alignment keys 404, and removing (e.g., stripping) any photoresist used in the lithography process. Alignment keys 404 can also be made as a portion of a black matrix layer.

Glass support plate 402 is covered with an etch mask 406 comprising a photoresist material. Etch mask 406 includes openings 408 that expose portions of glass support plate 402 that correspond to locations of border pixels. Etch mask 406 also includes openings 410 that expose portions of glass support plate 402 that correspond to locations of field pixels. Etch mask 406 can be patterned to include openings 408 and 410 using a lithography process, for example. Such a lithography process can include, for example, patterning etch mask 406 by applying a photoresist on glass support plate 402, exposing and developing a pattern on the photoresist, and removing (e.g., by etching) material from glass support plate 402 based, at least in part, on the pattern. In particular, portions 412 of etch mask 406, which shield portions of glass support plate 402 from etching, correspond to locations of glass spacers.

Figure 5:
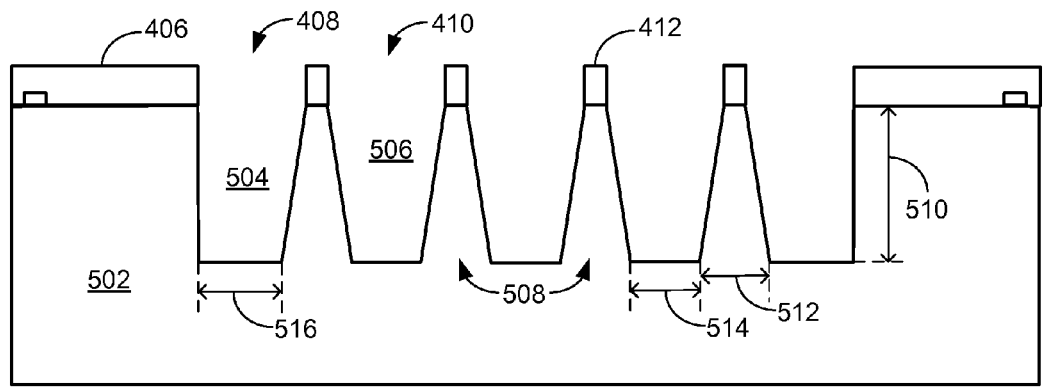

FIG. 5 is a cross-section view of a glass support plate 502 resulting from masking and etching processes performed on glass support plate 402. In particular, openings 408 of etch mask 406 expose portions of glass support plate 402 resulting in recessed border pixel regions 504 that correspond to locations of border pixels. Openings 410 expose portions of glass support plate 402 resulting in recessed field pixel regions 506 that correspond to locations of field pixels. Portions 412 of etch mask 406 shield glass support plate 402 from etching, resulting in columns of un-etched glass comprising glass spacers 508.

In some embodiments, an etching process that forms recessed border pixel regions 504 and recessed field pixel regions 506 involves chemical wet etching by hydrofluoric acid or mixture of hydrofluoric acid and ammonium fluoride, for example, to etch glass substrate 402. Such chemical etching isotropically etches glass substrate 402 to form glass spacers 508 that are wider toward the bottom of the recessed regions compared to the top of glass spacers 508. An aspect ratio of glass spacers 508 is given by the ratio spacer height 510 to spacer width 512. In some example embodiments, spacer height 510 is in a range from about 20 micrometers to about 50 micrometers, etched out of glass support plate 402 that can be about 300 to about 500 micrometers. Spacer width 512 is about 5 micrometers to about 50 micrometers, giving an aspect ratio of glass spacers in a range of about 0.5 to 4.0. Width 514 at the bottoms of recessed field pixel regions 506 is about 120 micrometers, for example, which depends on pixel dimensions, while width at the bottoms 516 of recessed border pixel regions 504 is about 1000 micrometers, for example.

Figure 6:
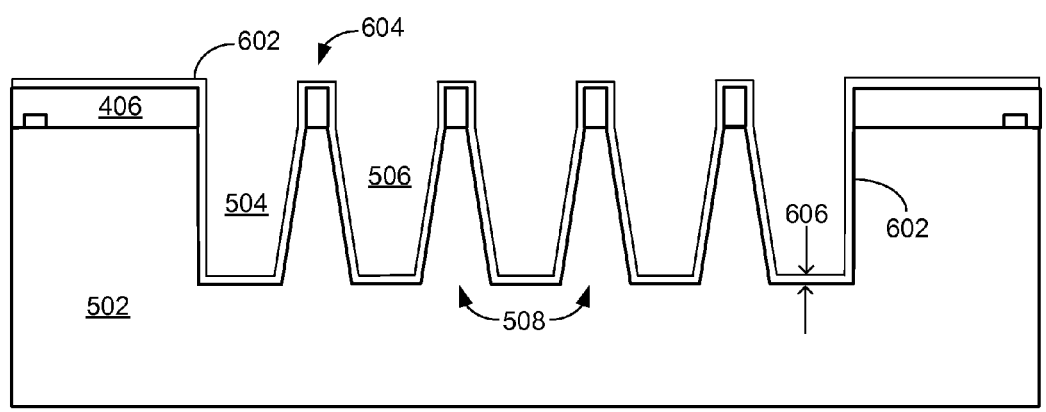

FIG. 6 is a cross-section view of glass support plate 502 after deposition of a transparent conductive material, such as indium tin oxide (ITO), for example. In some implementations, ITO can be deposited by a sputtering technique performed at or near room temperature. Resulting ITO layer 602 can cover surfaces of recessed border pixel regions 504 and recessed field pixel regions 506, including tops 604 of glass spacers 508 that still include portions 412 of etch mask 406. ITO layer 602 can have a thickness 606, for example, of less than about 100 nanometers thick.

Figure 7:
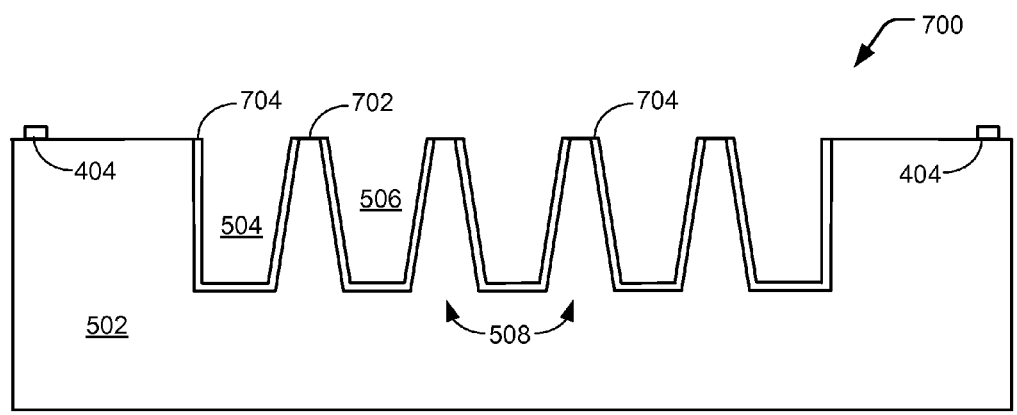

FIG. 7 is a cross-section view of a structure 700 including glass support plate 502 after an etching and/or polishing process of removing etch mask 406 and any portions of ITO layer 602 overlying etch mask 406. Alignment keys 404, which may comprise metal, remain through the etching and/or polishing process. Tops 604 of glass spacers 508 that still include portions 412 of etch mask 406 are removed to expose tops 702 of glass spacers 508. Remaining portions 704 of ITO, covering inside surfaces of recessed border pixel regions 504 and recessed field pixel regions 506, can be baked at elevated temperatures greater than about 200 degrees Celsius, for example.

Figure 8:
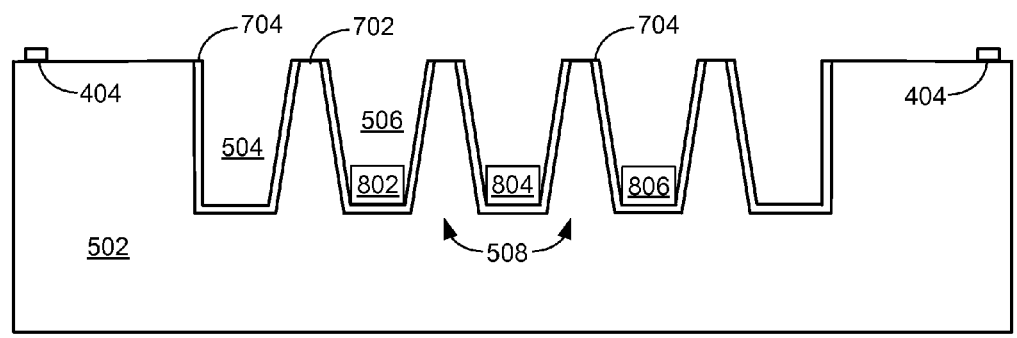

FIG. 8 is a cross-section view of glass support plate 502 after color filter materials 802-806 are deposited into bottoms of recessed field pixel regions 506. Color filter materials 802-806, in contact with ITO layer 704, can be deposited by a slit coating process or ink jet printing techniques, for example. In some implementations, ink jet printing involves depositing relatively small amounts of materials at a plurality of particular locations corresponding to a pixelated pattern. Color filter materials 802-806 can be arranged by color in any of a number of configurations. For example, color filter material 802 can comprise red (R) color filter material, color filter material 804 can comprise green (G) color filter material, and color filter material 806 can comprise Blue (B) color filter material. Moreover, white (W) or clear (e.g., no color filter material) can be interspersed among color filter materials 802-806. Accordingly, color filter materials 802-806 can be arranged in RGBW quad, RGB stripe, RGBW rectangular, or RGBW pentile L6W configurations, for example. Color filter materials 802-806 can comprise a photoresist (e.g. about 1 micrometer thick) with respective color pigments, for example.

Figure 9:
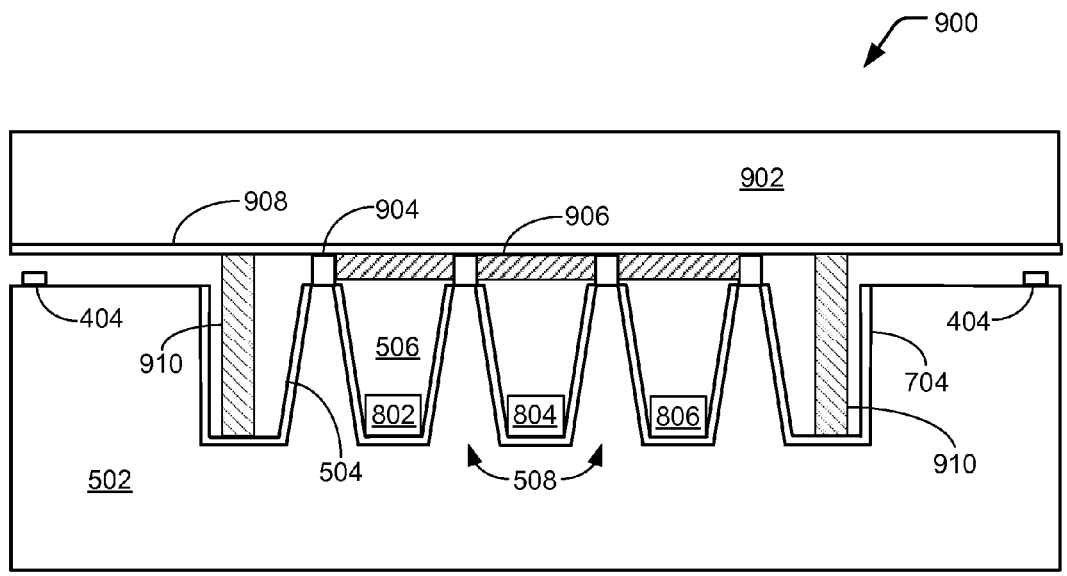

FIG. 9 is a cross-section view of an electrowetting display 900 including the structure of glass support plate 502 including a coupled second support plate 902 covering the structure of glass support plate 502. In reference to descriptions of embodiments for FIGS. 1-2, glass support plate 502 may be called a top support plate and second support plate 902 may be called a bottom support plate, though the structure in FIG. 9 appears opposite to such descriptive terms. As mentioned above, "top" and "bottom" are not intended to have any meaning with reference to gravitational direction or viewing direction.

Bottom support plate 902 includes pixel walls 904 and oil film 906 in pixel regions partitioned by pixel walls 904. Bottom support plate 902 also includes a conductive layer, such as either an ITO layer 908 for transmissive/transparent mode or an aluminum layer for reflective mode. A seal material 910 extends between bottoms of recessed border pixel regions 504 of top support plate 502 and ITO layer 908 of bottom support plate 902. Pixel walls 904, oil film 906, and ITO layer 908 are constructed on bottom support plate 902 before bottom support plate 902 is coupled to top support plate 502. Such coupling involves physical contact between pixel walls 904 and tops of glass spacers 508. In some embodiments, before such coupling, seal material 910 is constructed on bottom support plate 902, while in other embodiments seal material 910 is constructed on top support plate 502. Alignment keys 404 can be used to align features (e.g., pixel walls 904) of bottom support plate 902 with features (e.g., spacers 508) of top support plate 502, for example.

Figure 10:
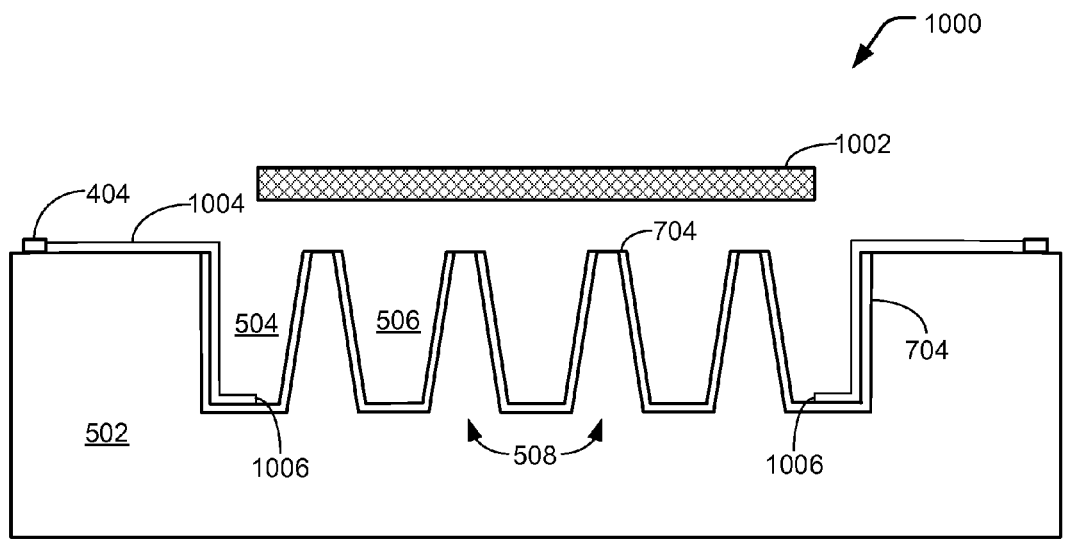

While, electrowetting display 900 comprises a particular configuration, alternative fabrication process can result in electrowetting displays having different configurations. For example, FIG. 10 illustrates a cross-section of a structure 1000 resulting from some process steps performed on structure 700 shown in FIG. 7, according to alternative embodiments. In other words, fabrication processes up through FIG. 7 can be the same for different embodiments, but subsequent process steps can be different. In the alternative embodiments illustrated in FIG. 10, a lithographic shadow mask 1002 is placed over recessed field pixel regions 506 including spacers 508, which are covered with ITO layer 704. Shadow mask 1002 is also placed over a portion of recessed border pixel regions 504, also covered with ITO layer 704. A second ITO layer 1004 is deposited on glass support plate 502 including ITO layer 704. Locations of such deposition of second ITO layer 1004 are based, at least in part, on the location and size of shadow mask 1002. For example, second ITO layer 1004 terminates along bottoms of recessed border regions 504, denoted by 1006. Second ITO layer 1004 can act as a conductive bridge between ITO layer 704 and regions on the top of glass support plate 502.

Figure 11:
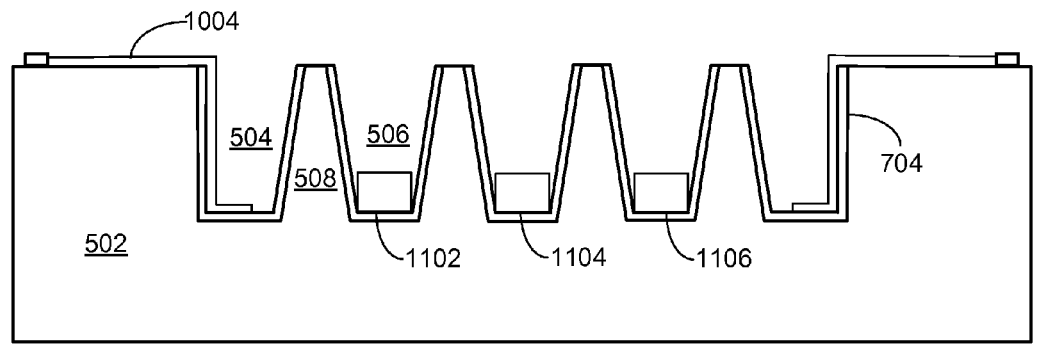

FIG. 11 is a cross-section view of structure 1000 including glass support plate 502 after color filter materials 1102-1106 are deposited into bottoms of recessed field pixel regions 506. Color filter materials 1102-1106, in contact with ITO layer 704, can be deposited by a slit coating process or ink jet printing techniques, for example.

Figure 12:
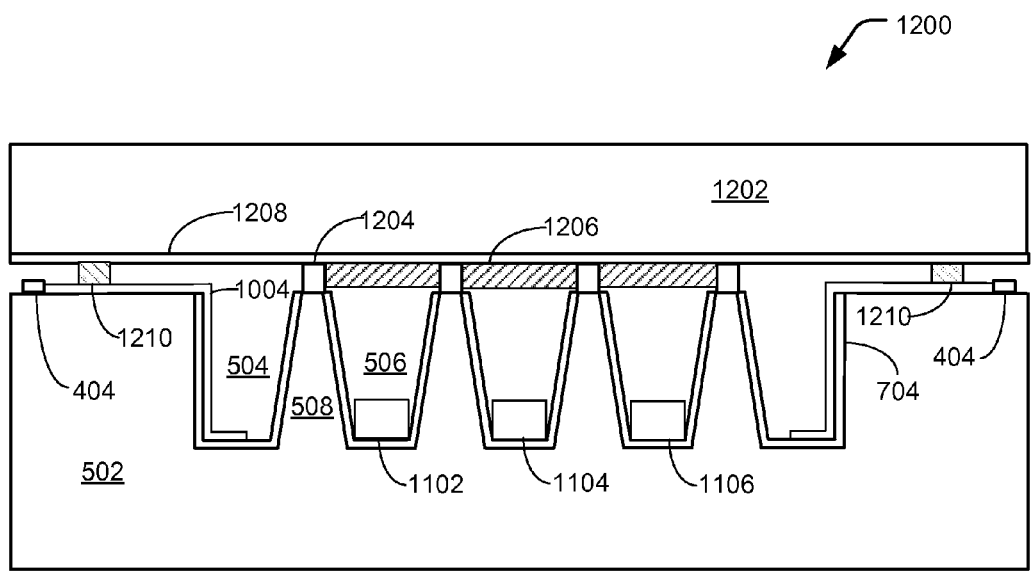

FIG. 12 is a cross-section view of an electrowetting display 1200 including the structure of glass support plate 502 coupled to a second support plate 1202 covering the structure of glass support plate 502. As mentioned above, in reference to descriptions of embodiments for FIGS. 1-2, glass support plate 502 may be called a "top" support plate and second support plate 902 may be called a "bottom" support plate, though the structure in FIG. 12 appears opposite to such descriptive terms. As mentioned above, "top" and "bottom" are not intended to have any meaning with reference to gravitational direction or viewing direction.

Bottom support plate 1202 includes pixels walls 1204 and oil film 1206 in pixel regions partitioned by pixel walls 1204. Bottom support plate 1202 also includes a conductive layer, such as either an ITO layer 1208 for transmissive/transparent mode or an aluminum layer for reflective mode. A seal material 1210 extends between second ITO layer 1004 of top support plate 502 and ITO layer 1208 of bottom support plate 1202. Seal material 1210 can have a relatively small height of about 3 micrometers to about 5 micrometers, for example. Pixels walls 1204, oil film 1206, and ITO layer 1208 are constructed on bottom support plate 1202 before bottom support plate 1202 is coupled to top support plate 502. Such coupling involves physical contact between pixel walls 1204 and tops of glass spacers 508. In some embodiments, before such coupling, seal material 1210 is constructed on bottom support plate 1202, while in other embodiments seal material 1210 is constructed on top support plate 502. Alignment keys 404 can be used to align features (e.g., pixel walls 1204) of bottom support plate 1202 with features (e.g., spacers 508) of top support plate 502, for example.

Figure 13:
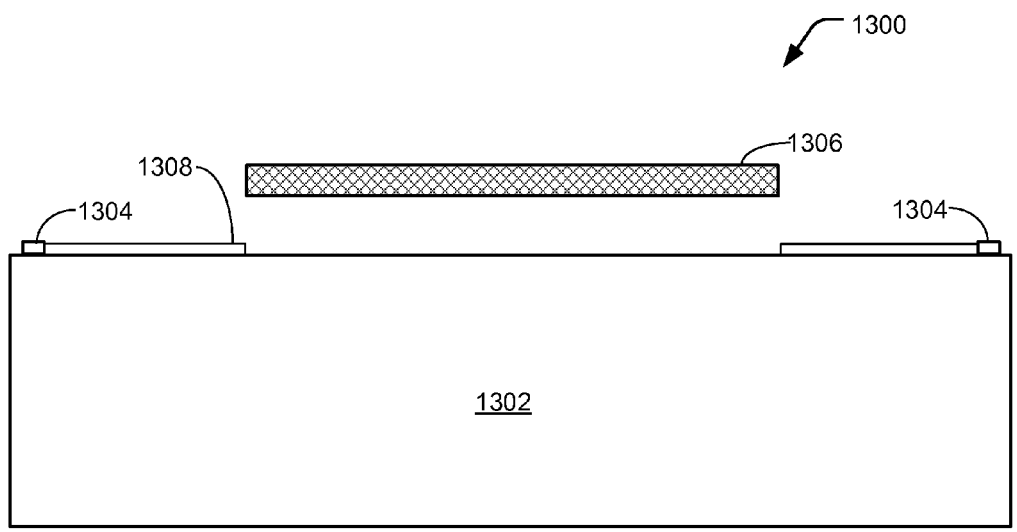

While, electrowetting display 1200 comprises a particular configuration, alternative fabrication processes can result in electrowetting displays having different configurations. FIG. 13 illustrates a cross-section of structure 1300 including a glass support plate 1302 and alignment keys 1304, similar to or the same as shown in FIG. 4. A lithographic shadow mask 1306 is placed over a portion of glass support plate 1302. Such a portion corresponds to a pixel display area, where recessed pixel regions will be subsequently etched from glass support plate 1302. Using shadow mask 1306 as a shield, ITO material can be deposited onto glass support plate 1302 using a sputtering process at room temperature, for example, to form a first ITO layer 1308 on glass support plate 1302 substantially outside the pixel display area. First ITO layer 1308 can have a thickness greater than about 100 nanometers, for example.

Figure 14:
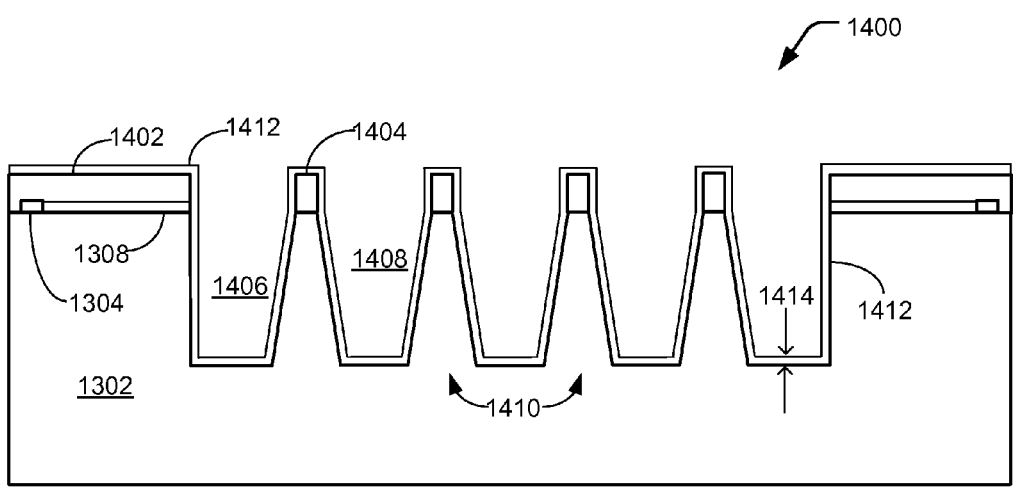

FIG. 14 illustrates a cross-section of structure 1400 subsequent to a number of process steps performed on structure 1300, as follows. Glass support plate 1302, alignment keys 1304, and first ITO layer 1308 are covered with an etch mask 1402 comprising a photoresist material. Etch mask 1402 includes openings that expose portions of glass support plate 1302 that correspond to locations of border pixels and locations of field pixels. Etch mask 1402 can be patterned to include such openings using a lift-off process, for example. Portions 1404 of etch mask 1402, which shield portions of glass support plate 1302 from etching, correspond to locations of glass spacers. Portions of etch mask 1402 also shield first ITO layer 1308 on glass support plate 1302 from etching.

An etching process subsequently forms recessed border pixel regions 1406 and recessed field pixel regions 1408. The etching process may involve chemical wet etching by hydrofluoric acid or ammonia fluoride, for example, to etch glass support plate 1302. Such chemical etching isotropically etches glass support plate 1302 to form glass spacers 1410 that are wider toward the bottom of the recessed regions compared to the top of glass spacers 1410.

Subsequent to forming a structure including recessed border pixel regions 1406 and recessed field pixel regions 1408, ITO is deposited over the structure by a sputtering technique performed at or near room temperature. A resulting second ITO layer 1412 can cover surfaces of recessed border pixel regions 1406 and recessed field pixel regions 1408, including tops of glass spacers 1410 that still include portions 1404 of etch mask 1402. Second ITO layer 1412 can have a thickness 1414, for example, of less than about 30 nanometers thick.

Figure 15:
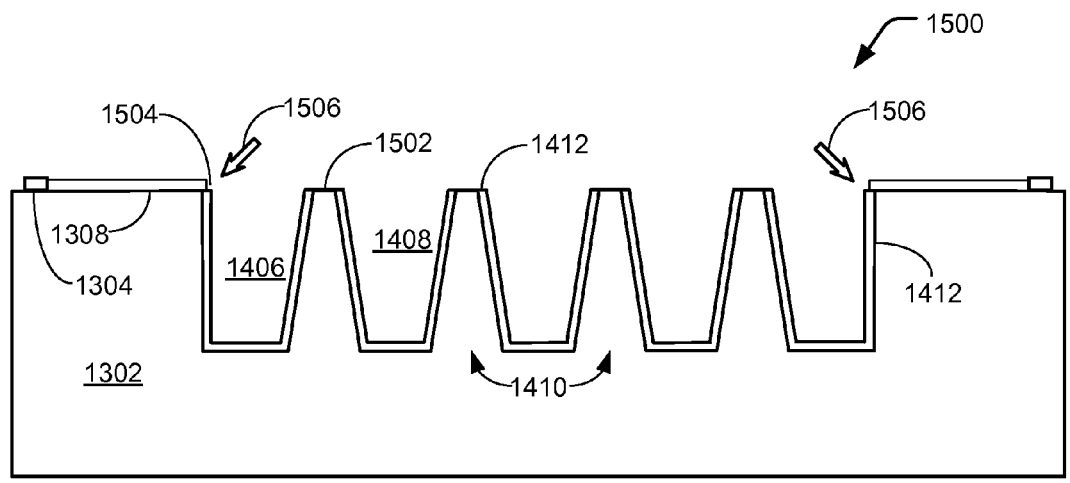

FIG. 15 is a cross-section view of a structure 1500 including glass support plate 1302 after an etching and/or polishing process of removing etch mask 1402 and any portions of second ITO layer 1412 overlying etch mask 1402. Alignment keys 1304, which may comprise metal, remain through the etching and/or polishing process. Portions 1404 of etch mask 1402 are also removed to expose tops 1502 of glass spacers 1410. Portions of first ITO layer 1308 remain on a top portion of glass support plate 1302. Remaining portions of second ITO layer 1412 cover inside surfaces of recessed border pixel regions 1406 and recessed field pixel regions 1408.

An interface 1504 between first ITO layer 1308 and second ITO layer 1412 may comprise a less than desirable conductive bridge between the two ITO layers. In other words, first ITO layer 1308 and second ITO layer 1412 form a seam, e.g., interface 1504, on an upper portion of glass support plate 1302 along the recessed border pixel regions. Details of the conductive integrity of interface 1504 depend, at least in part, on particular parameters of the etching process that removed etch mask 1402 and portions of second ITO layer 1412. Accordingly, interface 1504 may be at least partially filled or covered with a conductive resin, as indicated by arrows 1506, to ensure a good conductive bridge at interface 1504. Subsequent to application by a dispense or ink jet process, such a conductive resin and the two ITO layers can be baked at more than about 200 degrees Celsius, for example.

Figure 16:
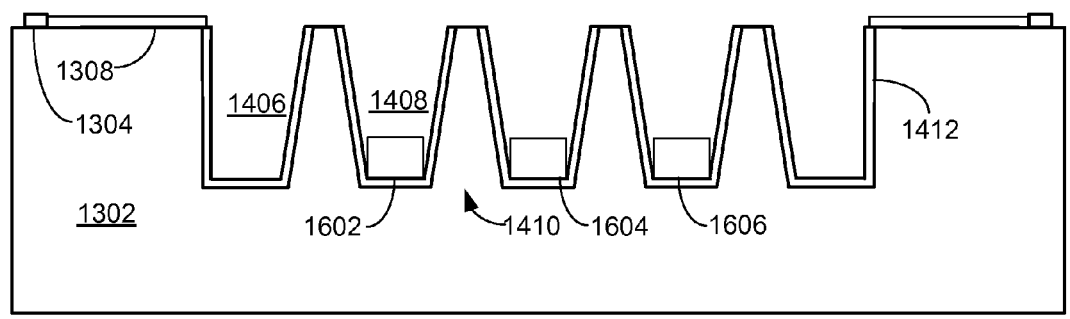

FIG. 16 is a cross-section view of glass support plate 1302 after color filter materials 1602-1606 are deposited into bottoms of recessed field pixel regions 1408. Color filter materials 1602-1606, in contact with second ITO layer 1412, can be deposited by a slit coating process or ink jet printing techniques, for example. Color filter materials 1602-1606 can be arranged by color in any of a number of configurations, such as RGBW quad, RGB stripe, RGBW rectangular, or RGBW pentile L6W configurations, just to name a few examples. Color filter materials 1602-1606 can comprise dyed oil, such as a thin film (e.g., about 4 micrometers thick) of decane with dye, for example.

Figure 17:
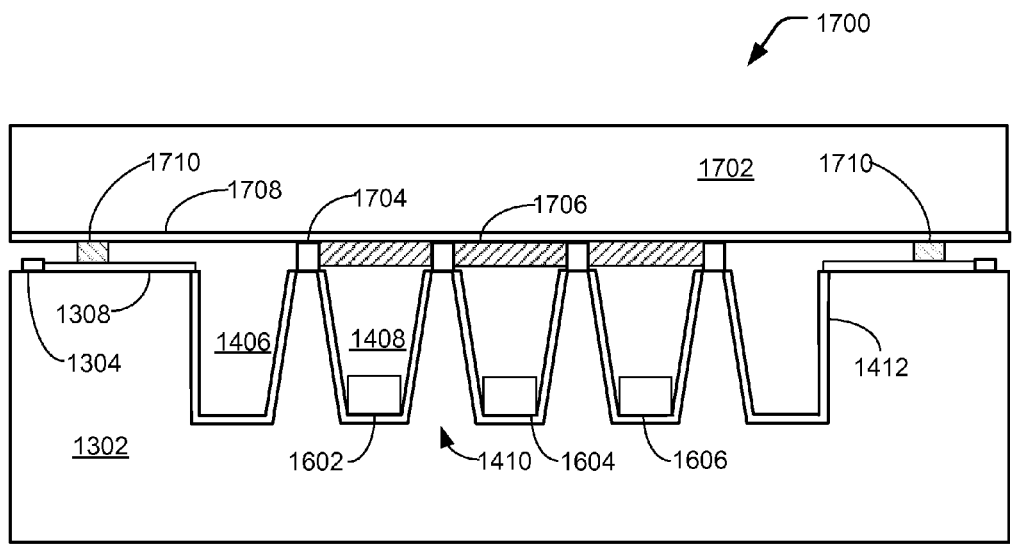

FIG. 17 is a cross-section view of an electrowetting display 1700 including the structure of glass support plate 1302 coupled to a second support plate 1702 covering the structure of glass support plate 1302. As mentioned above, in reference to descriptions of embodiments for FIGS. 1-2, glass support plate 1302 may be called a "top" support plate and second support plate 1702 may be called a "bottom" support plate, though the structure in FIG. 17 appears opposite to such descriptive terms. As mentioned above, "top" and "bottom" are not intended to have any meaning with reference to gravitational direction or viewing direction.

Bottom support plate 1702 includes pixels walls 1704 and oil film 1706 in pixel regions partitioned by pixel walls 1704. Bottom support plate 1702 also includes a conductive layer, such as either an ITO layer 1708 for transmissive/transparent mode or an aluminum layer for reflective mode. A seal material 1710 extends between second ITO layer 1308 of top support plate 1302 and ITO layer 1708 of bottom support plate 1702. Seal material 1710 can have a relatively small height of about 3 micrometers to about 5 micrometers, for example. Pixels walls 1704, oil film 1706, and ITO layer 1708 are constructed on bottom support plate 1702 before bottom support plate 1702 is coupled to top support plate 1302. Such coupling involves physical contact between pixel walls 1704 and tops of glass spacers 1410. In some embodiments, before such coupling, seal material 1710 is constructed on bottom support plate 1702, while in other embodiments seal material 1710 is constructed on top support plate 1302. Alignment keys 1304 can be used to align features (e.g., pixel walls 1704) of bottom support plate 1702 with features (e.g., spacers 1410) of top support plate 1302, for example.

Figure 18:
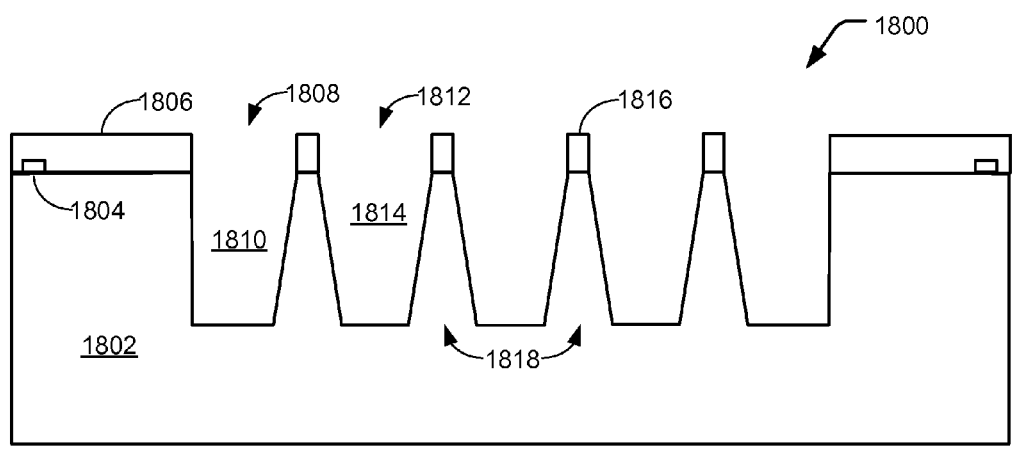

While, electrowetting display 1700 comprises a particular configuration, alternative fabrication processes can result in electrowetting displays having different configurations. FIG. 18 illustrates a cross-section of structure 1800 including a glass support plate 1802 and alignment keys 1804, similar to or the same as shown in FIG. 5. In particular, an etch mask 1806 includes openings 1808 that expose portions of glass support plate 1802 resulting in recessed border pixel regions 1810 that correspond to locations of border pixels. Openings 1812 expose portions of glass support plate 1802 resulting in recessed field pixel regions 1814 that correspond to locations of field pixels. Portions 1816 of etch mask 1806 shield glass support plate 1802 from etching, resulting in columns of un-etched glass comprising glass spacers 1818.

In some embodiments, an etching process that forms recessed border pixel regions 1810 and recessed field pixel regions 1814 involves chemical wet etching by hydrofluoric acid or ammonia fluoride, for example, to etch glass substrate 1802. Such chemical etching isotropically etches glass substrate 1802 to form glass spacers 1818 that are wider toward the bottom of the recessed regions compared to the top of glass spacers 1818.

Figure 19:
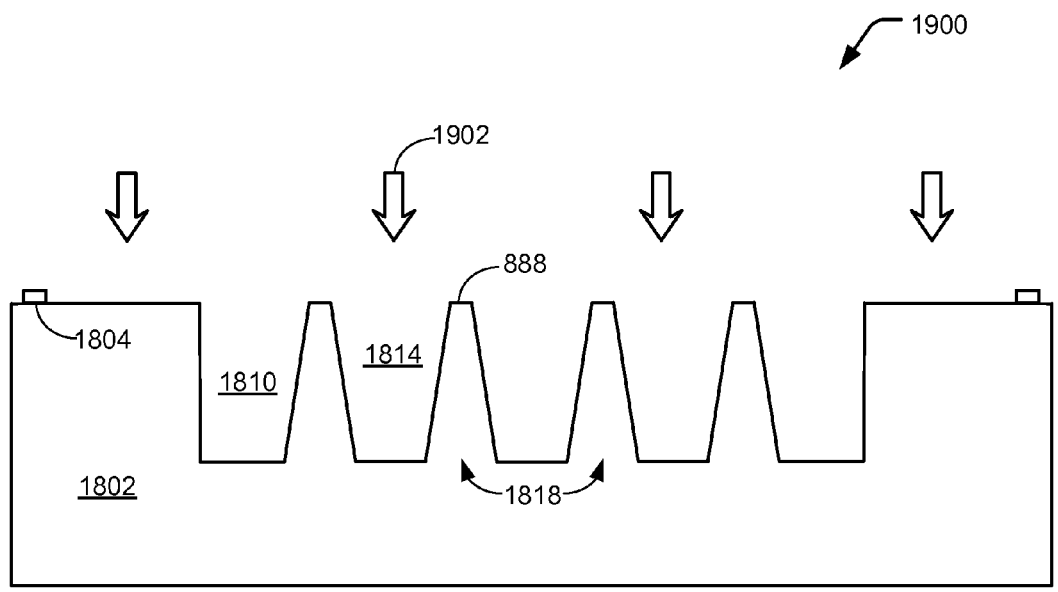
Figure 20:
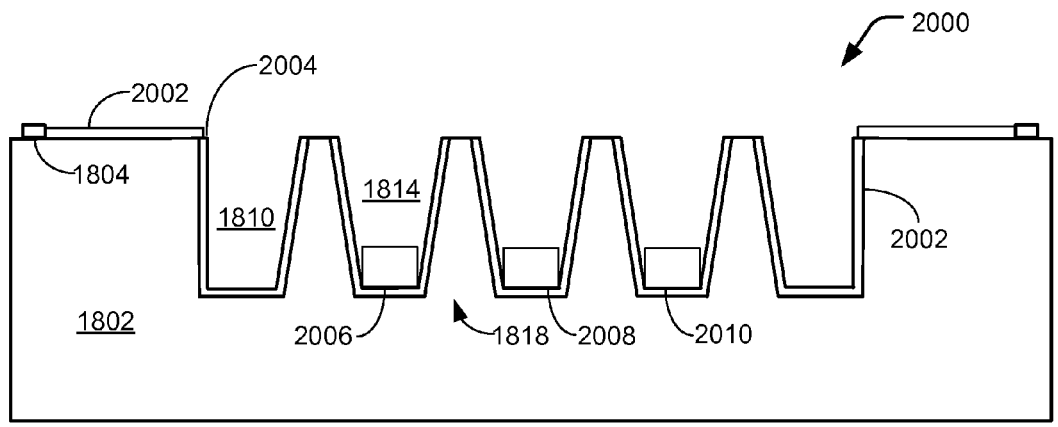

FIG. 19 illustrates a cross-section of structure 1900 including glass support plate 1802 and alignment keys 1804 subsequent to an etching and/or polishing process to remove etch mask 1806. As indicated by arrows 1902, a transparent conductive resin is applied by dispensing or ink jet techniques, for example, to cover glass spacers 1818, recessed border pixel regions 1810, and recessed field pixel regions 1814. A resulting structure 2000 is shown in FIG. 20, including conductive resin layer 2002. In some embodiments, conductive resin layer 2002 has a thickness of less than about 30 nanometers at bottoms of recessed border pixel regions 1810 and recessed field pixel regions 1814, while having a thickness greater than about 100 nanometers near tops of recessed border pixel regions 1810 and recessed field pixel regions 1814 (e.g., on tops of glass spacers 1818 and glass support plate 1802.

In some embodiments, an interface 2004 on an upper portion of glass support plate 1802 along the recessed border pixel regions 1810 may comprise a less than desirable conductive bridge between a portion of conductive resin layer 2002 on the top of glass support plate 1802 and a portion on a side of recessed border pixel regions 1810. Accordingly, interface 2004 may be at least partially filled or covered with additional conductive resin (e.g., applied in a separate process step) to ensure a good conductive bridge at interface 2004. Subsequent to application by a dispense process or ink jet process, the conductive resins can be baked at more than about 200 degrees Celsius, for example.

Color filter materials 2006-2010 is deposited into bottoms of recessed field pixel regions 1814. Color filter materials 2006-2010, in contact with conductive resin layer 2002, can be deposited by a slit coating process or ink jet printing techniques, for example. Color filter materials 2006-2010 can be arranged by color in any of a number of configurations, such as RGBW quad, RGB stripe, RGBW rectangular, or RGBW pentile L6W configurations, just to name a few examples. Color filter materials 802-806 can comprise a photoresist (e.g. about 1 micrometer thick) with respective color pigments, for example.

Figure 21:
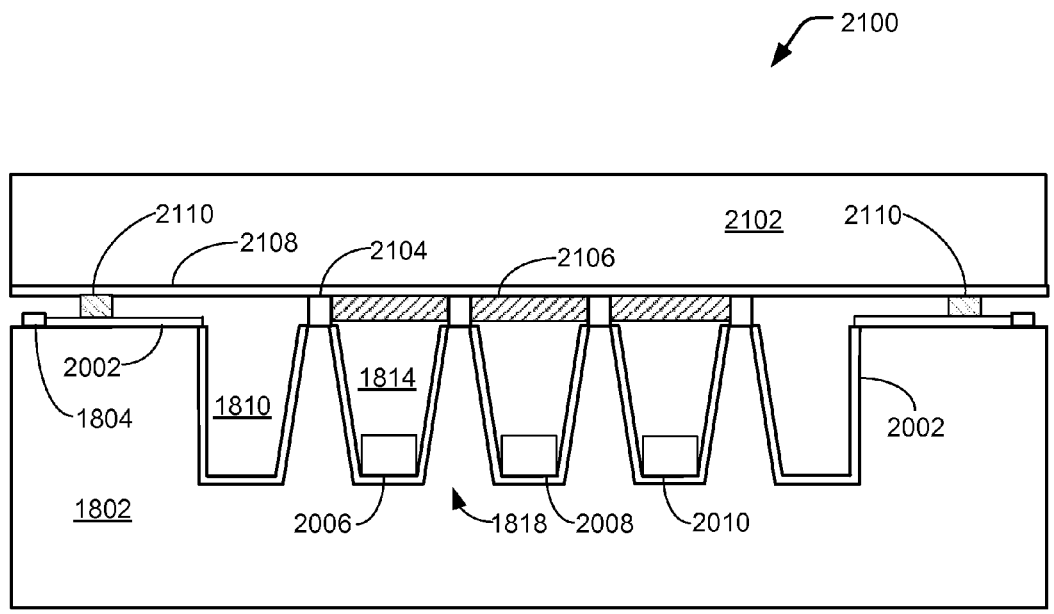

FIG. 21 is a cross-section view of an electrowetting display 2100 including the structure of glass support plate 1802 coupled to a second support plate 2102 covering the structure of glass support plate 1802. As mentioned above, in reference to descriptions of embodiments for FIGS. 1-2, glass support plate 1802 may be called a "top" support plate and second support plate 2102 may be called a "bottom" support plate, though the structure in FIG. 21 appears opposite to such descriptive terms. As mentioned above, "top" and "bottom" are not intended to have any meaning with reference to gravitational direction or viewing direction.

Bottom support plate 2102 includes pixels walls 2104 and oil film 2106 in pixel regions partitioned by pixel walls 2104. Bottom support plate 2102 also includes a clear conductive layer, such as an ITO layer 2108. A seal material 2110 extends between conductive resin layer 2002 of top support plate 1802 and ITO layer 2108 of bottom support plate 2102. Seal material 2110 can have a relatively small height of about 3 micrometers to about 5 micrometers, for example. Pixels walls 2104, oil film 2106, and ITO layer 2108 are constructed on bottom support plate 2102 before bottom support plate 2102 is coupled to top support plate 1802. Such coupling involves physical contact between pixel walls 2104 and tops of glass spacers 1818. In some embodiments, before such coupling, seal material 2110 is constructed on bottom support plate 2102, while in other embodiments seal material 2110 is constructed on top support plate 1802. Alignment keys 1804 can be used to align features (e.g., pixel walls 2104) of bottom support plate 2102 with features (e.g., glass spacers 1818) of top support plate 1802, for example.

Figure 22:
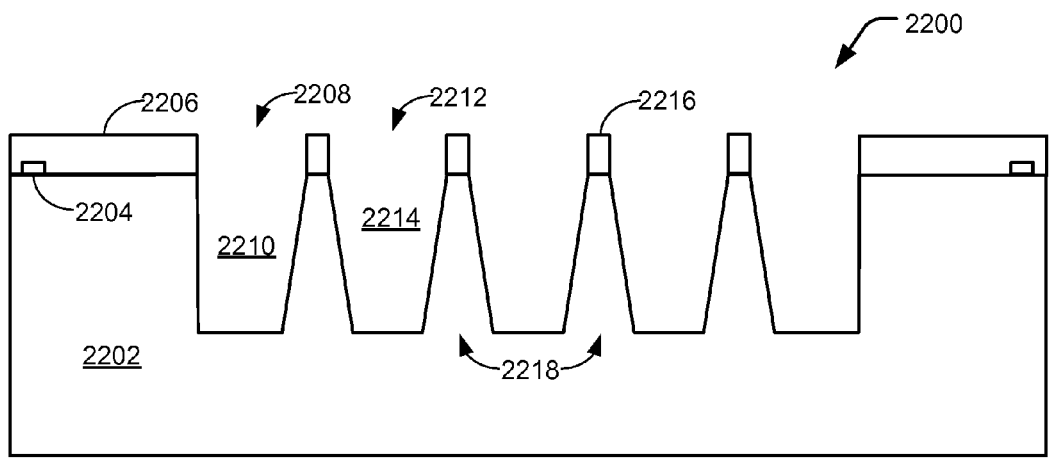

While, electrowetting display 2100 comprises a particular configuration, alternative fabrication processes can result in electrowetting displays having different configurations. FIG. 22 illustrates a cross-section of structure 2200 including a glass support plate 2202 and alignment keys 2204, similar to or the same as shown in FIG. 5. In particular, an etch mask 2206 includes openings 2208 that expose portions of glass support plate 2202 resulting in recessed border pixel regions 2210 that correspond to locations of border pixels. Openings 2212 expose portions of glass support plate 2202 resulting in recessed field pixel regions 2214 that correspond to locations of field pixels. Portions 2216 of etch mask 2206 shield glass support plate 2202 from etching, resulting in columns of un-etched glass comprising glass spacers 2218.

In some embodiments, an etching process that forms recessed border pixel regions 2210 and recessed field pixel regions 2214 involves chemical wet etching by either hydrofluoric acid or a mixture of hydrofluoric acid and ammonium fluoride, for example, to etch glass substrate 2202. Such chemical etching isotropically etches glass substrate 2202 to form glass spacers 2218 that are wider toward the bottom of the recessed regions compared to the top of glass spacers 2218.

Figure 23:
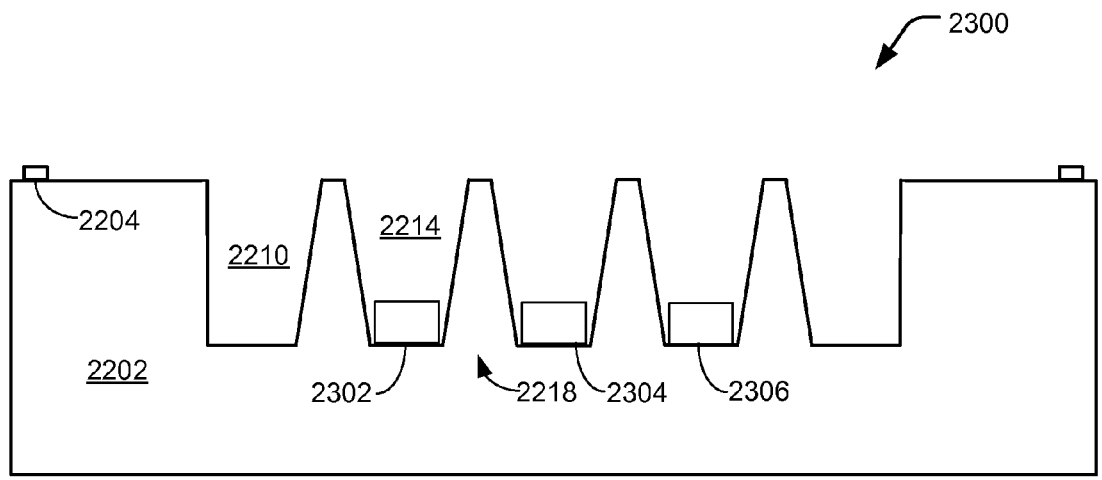

FIG. 23 illustrates a cross-section of structure 2300 including glass support plate 2202 and alignment keys 2204 subsequent to an etching and/or polishing process to remove etch mask 2206. Color filter material 2302-2306 is deposited into bottoms of recessed field pixel regions 2214. Color filter material 2302-2306 can be deposited by a slit coating process or ink jet printing techniques, for example. Color filter material 2302-2306 can be arranged by color in any of a number of configurations, such as RGBW quad, RGB stripe, RGBW rectangular, or RGBW pentile L6W configurations, just to name a few examples. Color filter material 802-806 can comprise a photoresist (e.g. about 1 micrometer thick) with respective color pigments, for example.

Figure 24:
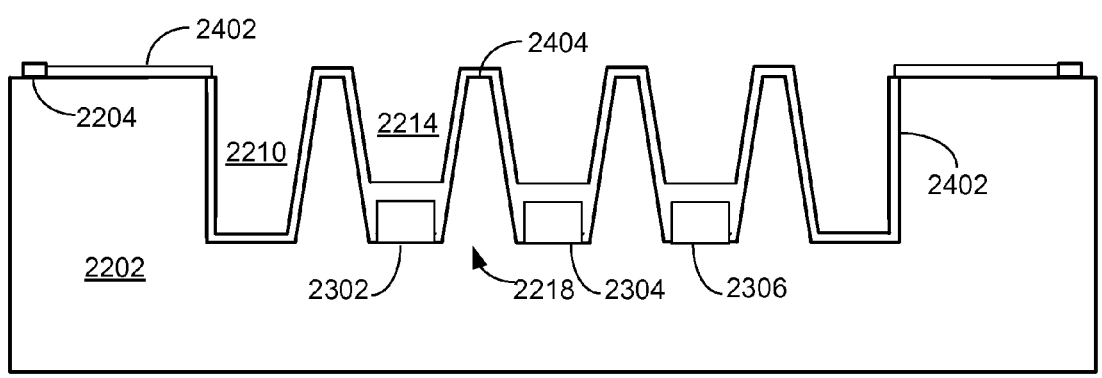

FIG. 24 is a cross-section view of glass support plate 2202 after deposition of a transparent conductive material, such as indium tin oxide (ITO), for example. In some implementations, ITO can be deposited by a sputtering technique performed at or near room temperature. Resulting ITO layer 2402 can cover surfaces of recessed border pixel regions 2210 and recessed field pixel regions 2214, including color filter material 2302-2306 and tops 2404 of glass spacers 2218. ITO layer 2402 can have a thickness of, for example, greater than about 30 nanometers thick.

Figure 25:
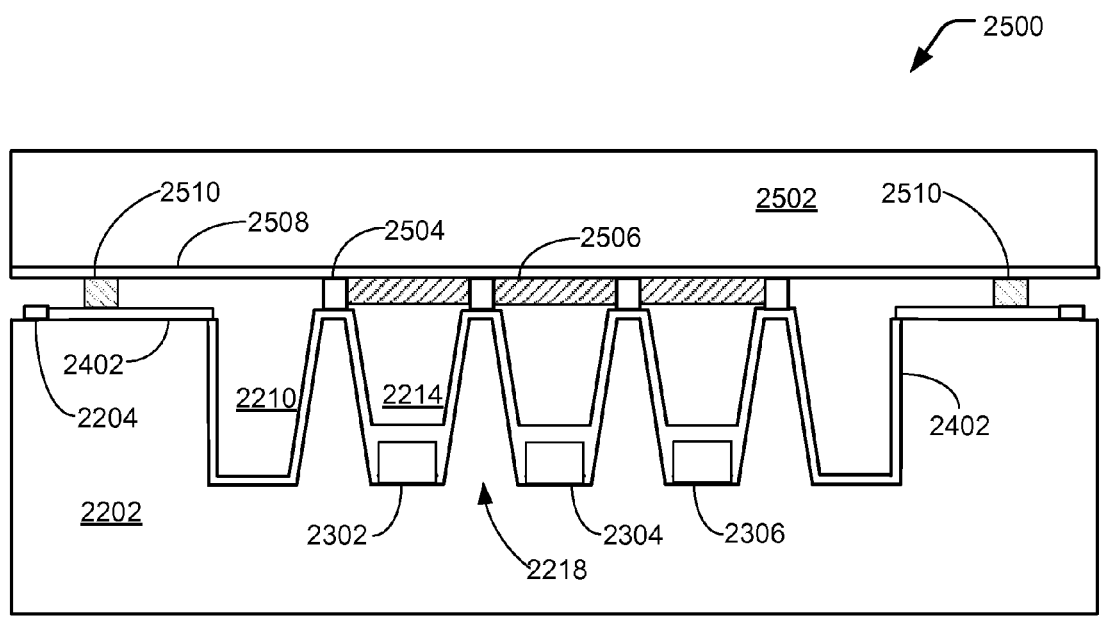

FIG. 25 is a cross-section view of an electrowetting display 2500 including the structure of glass support plate 2202 coupled to a second support plate 2502 covering the structure of glass support plate 2202. As mentioned above, in reference to descriptions of embodiments for FIGS. 1-2, glass support plate 2202 may be called a "top" support plate and second support plate 2502 may be called a "bottom" support plate, though the structure in FIG. 25 appears opposite to such descriptive terms. As mentioned above, "top" and "bottom" are not intended to have any meaning with reference to gravitational direction.

Figure 26:
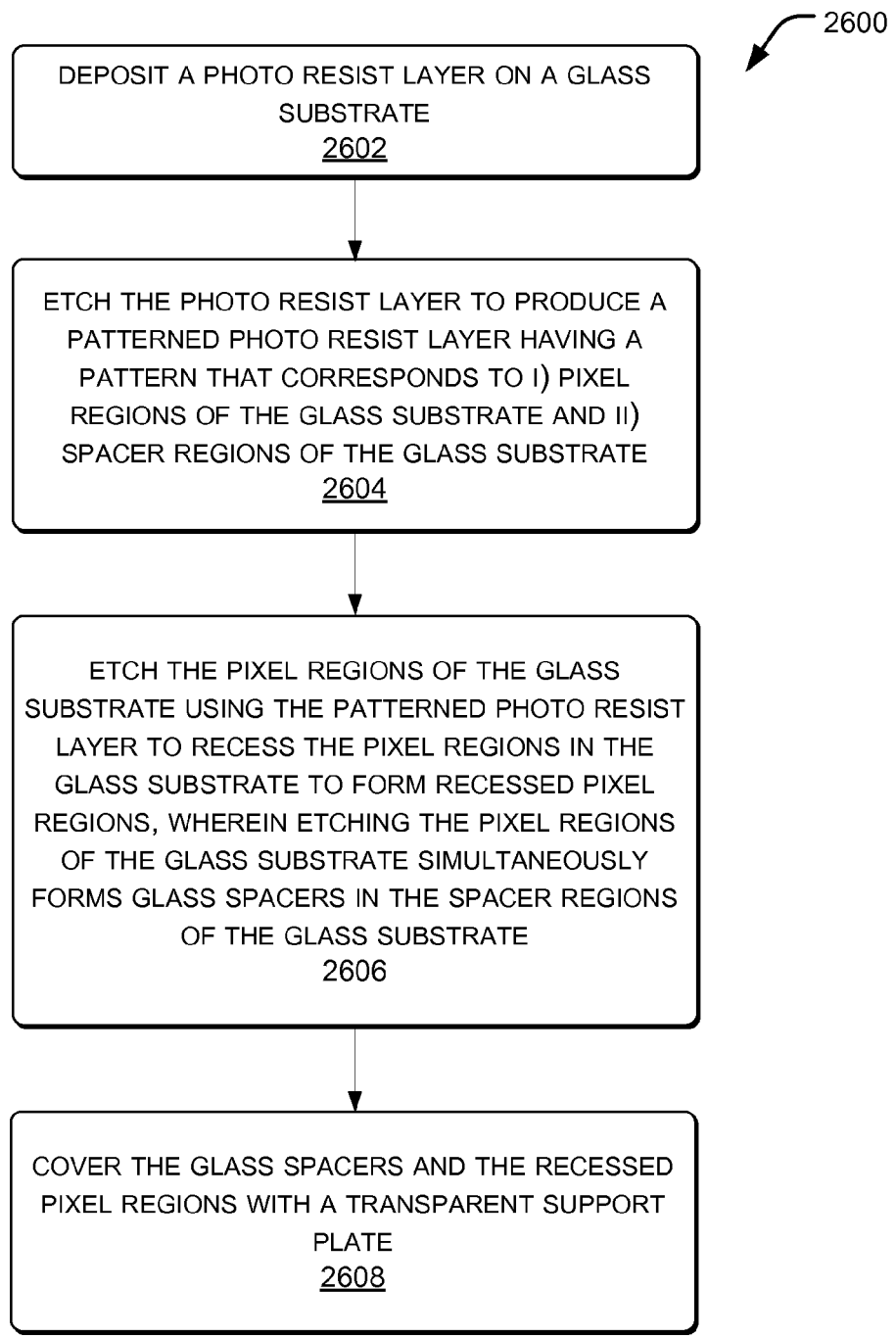
FIG. 26 illustrates a process of fabricating an electrowetting display, according to various embodiments.

Bottom support plate 2502 includes pixels walls 2504 and oil film 2506 in pixel regions partitioned by pixel walls 2504. Bottom support plate 2502 also includes a clear conductive layer, such as an ITO layer 2508. A seal material 2510 extends between ITO layer 2402 of top support plate 2202 and ITO layer 2508 of bottom support plate 2502. Seal material 2510 can have a relatively small height of about 3 micrometers to about 5 micrometers, for example. Pixels walls 2504, oil film 2506, and ITO layer 2508 are constructed on bottom support plate 2502 before bottom support plate 2502 is coupled to top support plate 2202. Such coupling involves physical contact between pixel walls 2504 and ITO layer 2402 overlying tops of glass spacers 2218. In some embodiments, before such coupling, seal material 2510 is constructed on bottom support plate 2502, while in other embodiments seal material 2510 is constructed on top support plate 2202. Alignment keys 2204 can be used to align features (e.g., pixel walls 2504) of bottom support plate 2502 with features (e.g., glass spacers 2218) of top support plate 2202, for example FIG. 26 illustrates a process 2600 of fabricating an electrowetting device, according to various embodiments. For example, the electrowetting device may be the same or similar to electrowetting devices 900, 1200, 1700, 2100, and 2500 illustrated in FIGS. 9, 12, 17, 21, and 25, respectively. At block 2602, photoresist layer is deposited on a glass substrate. At block 2604, the photoresist layer is etched to produce a patterned photoresist layer having a pattern that corresponds to i) pixel regions of the glass substrate and ii) spacer regions of the glass substrate. At block 2606, the pixel regions of the glass substrate are etched using the patterned photoresist layer to recess the pixel regions in the glass substrate to form recessed pixel regions. Etching the pixel regions of the glass substrate simultaneously forms glass spacers (which are not etched) in the spacer regions of the glass substrate. At block 2608, the glass spacers and the recessed pixel regions are covered with a support plate in a process of coupling the glass substrate with the support plate.

Figure 27:
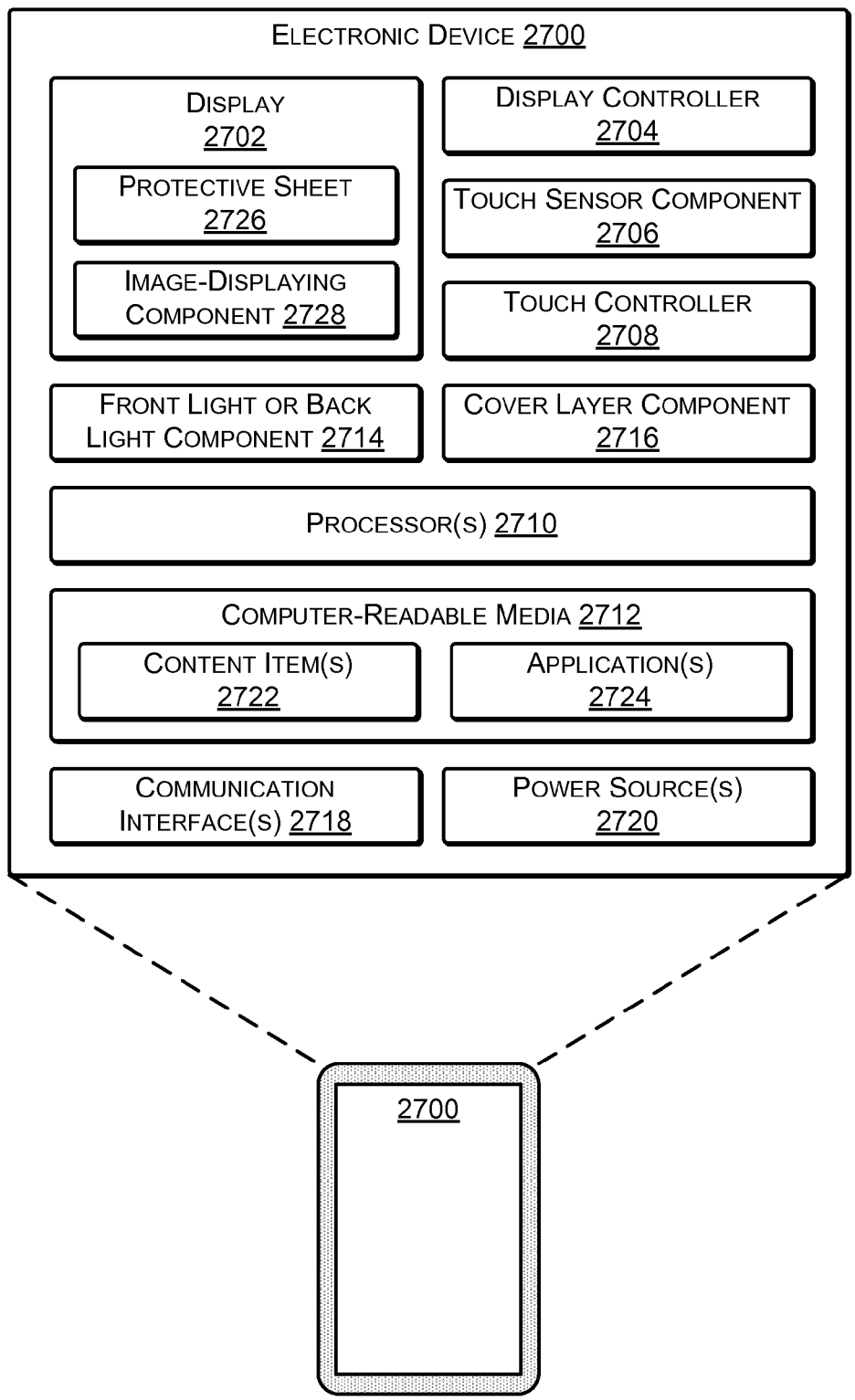
FIG. 27 illustrates an example electronic device equipped with a display device, according to some embodiments.

FIG. 27 illustrates an example electronic device 2700 that may incorporate any of the display devices discussed above, such as electrowetting devices 900, 1200, 1700, 2100, and 2500 illustrated in FIGS. 9, 12, 17, 21, and 25, respectively. The device 2700 may comprise any type of electronic device having a display. For instance, the device 2700 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 2700 may be a non-mobile electronic device (e.g., a computer display, a television, etc.). In addition, while FIG. 27 illustrates several example components of the electronic device 2700, it is to be appreciated that the device 2700 may also include other conventional components, such as an operating system, system busses, input/output components, and the like. Further, in other examples, such as in the case of a television or computer monitor, the electronic device 2700 may only include a subset of the components shown.

Regardless of the specific implementation of the electronic device 2700, the device 2700 includes a display 2702 and a corresponding display controller 2704. The display 2702 may represent a reflective display in some instances, such as an electronic paper display, a reflective LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even when very little or no power is supplied to the display. Some examples of the display 2702 that may be used with the implementations described herein include bi-stable LCD displays, cholesteric displays, micro electromechanical system (MEMS) displays, such as interferometric modulator displays, electrophoretic displays, electrofluidic pixel displays, electrowetting displays, photonic ink displays, gyricon displays, and the like. In other implementations, or for other types of devices 2700, the display 2702 may be an active display such as a liquid crystal display, a plasma display, a light emitting diode display, an organic light emitting diode display, and so forth. Accordingly, implementations herein are not limited to any particular display technology.

In an implementation, the display comprises an electrowetting display that employs an applied voltage to change the surface tension of a liquid in relation to a surface. For instance, by applying a voltage to a hydrophobic surface, the wetting properties of the surface can be modified so that the surface becomes increasingly hydrophilic. As one example of an electrowetting display, the modification of the surface tension acts as an optical switch by contracting a colored oil film (or a non-colored oil film with an additional and separate color filter) when a voltage is applied to individual pixels of the display. When the voltage is absent, the colored oil forms a continuous film within a pixel, and the color may thus be visible to a user of the display. On the other hand, when the voltage is applied to the pixel, the colored oil is displaced by the electrolyte and the pixel becomes transparent. When multiple pixels of the display are independently activated, the display can present a color or grayscale image. The pixels may form the basis for a transmissive, reflective, or transmissive/reflective (transreflective) display. Further, the pixels may be responsive to high switching speeds (e.g., on the order of several milliseconds), while employing small pixel dimensions. Accordingly, the electrowetting displays herein may be suitable for applications such as displaying video content. In addition, the lower power consumption of electrowetting displays in comparison to conventional LCD displays makes the technology suitable for displaying content on portable devices that rely on battery power.

As another example of an electrowetting display, modification of surface tension of a first liquid attracts the electrolyte (e.g., a second liquid) to the modified surface of the first fluid to displace the first liquid (e.g., colored oil). The first liquid can be a black oil which in combination with a color filter can provide a full color display. In the off-state, the black oil forms a continuous film within a pixel, so the pixel is black. In the on-state, the black oil is contracted to reveal the color of an underlying color filter. Alternatively, the black oil can be colored and a color filter need not be necessary to obtain all colors, for example.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 2702 may represent a backlit display, examples of which are mentioned above.

In addition to including the display 2702, FIG. 27 illustrates that some examples of the device 2700 may include a touch sensor component 2706 and a touch controller 2708. In some instances, at least one touch sensor component 2706 resides with, or is stacked on, the display 2702 to form a touch-sensitive display (e.g., an electronic paper touch-sensitive display). Thus, the display 2702 may be capable of both accepting user touch input and rendering content in response to or corresponding to the touch input. As several examples, the touch sensor component 2706 may comprise a capacitive touch sensor, a force sensitive resistance (FSR), an interpolating force sensitive resistance (IFSR) sensor, or any other type of touch sensor. In some instances, the touch sensor component 2706 is capable of detecting touches as well as determining an amount of pressure or force of these touches.

FIG. 27 further illustrates that the electronic device 2700 may include one or more processors 2710 and one or more computer-readable media 2712, as well as a front light component 2714 (which may alternatively be a backlight component in the case of a backlit display) for lighting the display 2702, a cover layer component 2716, such as a cover glass or cover sheet, one or more communication interfaces 2718 and one or more power sources 2720. The communication interfaces 2718 may support both wired and wireless connection to various networks, such as cellular networks, radio, WiFi networks, short range networks (e.g., Bluetooth®), infrared (IR), and so forth. In some implementations, one or more processors are the same or similar to controller 408, shown in FIG. 4. In such implementations, one or more processors 2710 can include a device to measure voltage, for example.

Depending on the configuration of the electronic device 2700, the computer-readable media 2712 (and other computer-readable media described throughout) is an example of computer storage media and may include volatile and non-volatile memory. Thus, the computer-readable media 2712 may include, but is not limited to, RAM, ROM, EEPROM, flash memory, or other memory technology, or any other medium that can be used to store computer-readable instructions, programs, applications, media items, and/or data which can be accessed by the electronic device 2700.

The computer-readable media 2712 may be used to store any number of functional components that are executable on the processor 2710, as well as content items 2722 and applications 2724. Thus, the computer-readable media 2712 may include an operating system and a storage database to store one or more content items 2722, such as eBooks, audio books, songs, videos, still images, and the like. The computer-readable media 2712 of the electronic device 2700 may also store one or more content presentation applications to render content items on the device 2700. These content presentation applications may be implemented as various applications 2724 depending upon the content items 2722. For instance, the content presentation application may be an electronic book reader application for rending textual electronic books, an audio player for playing audio books or songs, a video player for playing video, and so forth.

In some instances, the electronic device 2700 may couple to a cover (not shown in FIG. 27) to protect the display (and other components in the display stack or display assembly) of the device 2700. In one example, the cover may include a back flap that covers a back portion of the device 2700 and a front flap that covers the display 2702 and the other components in the stack. The device 2700 and/or the cover may include a sensor (e.g., a Hall effect sensor) to detect when the cover is open (i.e., when the front flap is not atop the display and other components). The sensor may send a signal to the front light component 2714 when the cover is open and, in response, the front light component 2714 may illuminate the display 2702. When the cover is closed, meanwhile, the front light component 2714 may receive a signal indicating that the cover has closed and, in response, the front light component 2714 may turn off.

Furthermore, the amount of light emitted by the front light component 2714 may vary. For instance, upon a user opening the cover, the light from the front light may gradually increase to its full illumination. In some instances, the device 2700 includes an ambient light sensor (not shown in FIG. 27) and the amount of illumination of the front light component 2714 may be based at least in part on the amount of ambient light detected by the ambient light sensor. For example, the front light component 2714 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 2702 may vary depending on whether the front light component 2714 is on or off, or based on the amount of light provided by the front light component 2714. For instance, the electronic device 2700 may implement a larger default font or a greater contrast when the light is off compared to when the light is on. In some instances, the electronic device 2700 maintains, when the light is on, a contrast ratio for the display that is within a certain defined percentage of the contrast ratio when the light is off.

As described above, the touch sensor component 2706 may comprise a capacitive touch sensor that resides atop the display 2702. In some examples, the touch sensor component 2706 may be formed on or integrated with the cover layer component 2716. In other examples, the touch sensor component 2706 may be a separate component in the stack of the display assembly. The front light component 2714 may reside atop or below the touch sensor component 2706. In some instances, either the touch sensor component 2706 or the front light component 2714 is coupled to a top surface of a protective sheet 2726 of the display 2702. As one example, the front light component 2714 may include a lightguide sheet and a light source (not shown in FIG. 27). The lightguide sheet may comprise a substrate (e.g., a transparent thermoplastic such as PMMA or other acrylic), a layer of lacquer and multiple grating elements formed in the layer of lacquer that function to propagate light from the light source towards the display 2702, thus illuminating the display 2702.

The cover layer component 2716 may include a transparent substrate or sheet having an outer layer that functions to reduce at least one of glare or reflection of ambient light incident on the electronic device 2700. In some instances, the cover layer component 2716 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, the protective sheet 2726 may include a similar UV-cured hard coating on the outer surface. The cover layer component 2716 may couple to another component or to the protective sheet 2726 of the display 2702. The cover layer component 2716 may, in some instances, also include a UV filter, a UV-absorbing dye, or the like, for protecting components lower in the stack from UV light incident on the electronic device 2700. In still other examples, the cover layer component 2716 may include a sheet of high-strength glass having an antiglare and/or antireflective coating.

The display 2702 includes the protective sheet 2726 overlying an image-displaying component 2728. For example, the display 2702 may be preassembled to have the protective sheet 2726 as an outer surface on the upper or image-viewing side of the display 2702. Accordingly, the protective sheet 2726 may be integral with and may overlie the image-displaying component 2728. The protective sheet 2726 may be optically transparent to enable a user to view, through the protective sheet 2726, an image presented on the image-displaying component 2728 of the display 2702.

In some examples, the protective sheet 2726 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 126 may include a coating, such as the hard coating described above. For instance, the hard coating may be applied to the outer surface of the protective sheet 2726 before or after assembly of the protective sheet 2726 with the image-displaying component 2728 of the display 2702. In some examples, the hard coating may include a photoinitiator or other reactive species in its composition, such as for curing the hard coating on the protective sheet 2726. Furthermore, in some examples, the protective sheet 2726 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 2726, thereby protecting the image-displaying component 2728 from UV light.

According to some implementations herein, one or more of the components discussed above may be coupled to the display 2702 using LOCA. For example, suppose that the light guide portion of the front light component 2714 is to be coupled to the display 2702. The light guide may be coupled to the display 2702 by placing the LOCA on the outer or upper surface of the protective sheet 2726. When the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 2714 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 2714. In other implementations, the LOCA may be placed near a center of the protective sheet 2726, and pressed outwards towards a perimeter of the top surface of the protective sheet 126 by placing the front light component 2714 on top of the LOCA. The LOCA may then be cured by directing UV light through the front light component 2714. As discussed above, and as discussed additionally below, various techniques, such as surface treatment of the protective sheet, may be used to prevent discoloration of the LOCA and/or the protective sheet 2726.

While FIG. 27 illustrates a few example components, the electronic device 2700 may have additional features or functionality. For example, the device 2700 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the device 2700 may reside remotely from the device 2700 in some implementations. In these implementations, the device 2700 may utilize the communication interfaces 2718 to communicate with and utilize this functionality.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, apparatuses, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. A method for fabricating an electrowetting display, the method comprising:
   depositing a photoresist layer on a glass substrate;
   patterning the photoresist layer to produce a patterned photoresist layer that includes (i) first regions that expose the glass substrate and (ii) second regions that cover the glass substrate;
   etching the glass substrate in areas of the glass substrate that are exposed by the first regions of the photoresist layer to form glass spacers in areas of the glass substrate that are covered by the second regions of the photoresist layer;
   forming a transparent conductive layer on at least portions of the etched glass substrate, wherein the transparent conductive layer comprises indium tin oxide (ITO) or a transparent conductive resin; and
   coupling a support plate to the glass substrate, wherein the support plate includes pixel walls that partition a liquid into individual portions that each correspond to a pixel.

2. The method of claim 1, wherein coupling the support plate to the glass substrate further includes aligning the pixel walls of the support plate with corresponding tops of the glass spacers.

3. The method of claim 1, wherein:
   etching the glass substrate in the areas of the glass substrate that are exposed by the first regions of the photoresist layer further forms recessed regions among the glass spacers; and
   the method further comprises partially filling the recessed regions with color filter material.

4. A method for fabricating an electrowetting display, the method comprising:
   applying a photoresist layer on a transparent substrate;
   removing portions of the photoresist layer to produce a patterned photoresist layer that includes (i) a first region that exposes the transparent substrate and (ii) a second region that covers the transparent substrate;
   removing portions of the transparent substrate exposed by the first region of the patterned photoresist layer to form cavities in the transparent substrate, wherein individual ones of the cavities correspond to pixels, and wherein removing the portions of the transparent substrate exposed by the first region of the patterned photoresist layer forms transparent spacers in portions of the transparent substrate that are covered by the second region of the patterned photoresist layer; and
   joining the transparent spacers to at least portions of pixel walls of a support plate.

5. The method of claim 4, wherein the pixel walls of the support plate partition an electrowetting oil into portions of the electrowetting oil that each correspond to a pixel.

6. The method of claim 5, further comprising:
   aligning at least portions of the pixel walls of the support plate to corresponding ones of the transparent spacers.

7. The method of claim 4, further comprising:
   forming a layer of transparent electrically conductive material on surfaces of the transparent substrate that at least partially surround the cavities of the transparent substrate.

8. The method of claim 7, further comprising:
   based, at least in part, on the patterned photoresist layer, removing portions of the transparent substrate to form a recessed border region along a periphery of the cavities in the transparent substrate; and
   depositing seal material between the layer of transparent electrically conductive material and the support plate, wherein the seal material is in the recessed border region.

9. The method of claim 7, wherein:
   the layer of transparent electrically conductive material comprises a first layer of transparent electrically conductive material, and the method further comprises:
   based, at least in part, on the patterned photoresist layer, removing portions of the transparent substrate to form a border region along a periphery of the cavities in the transparent substrate;

placing a shadow mask over the cavities while exposing the border region; and depositing a second layer of transparent electrically conductive material on the exposed border region.

10. The method of claim 9, further comprising:

depositing seal material between the second layer of transparent electrically conductive material and the support plate.

11. The method of claim 9, further comprising:

dispensing a conductive resin to form an electrical connection between the first layer of transparent electrically conductive material and the second layer of transparent electrically conductive material.

12. The method of claim 7, wherein the transparent electrically conductive material comprises indium tin oxide (ITO).

13. The method of claim 7, further comprising:

at least partially filling the cavities in the transparent substrate with color filter material.

14. The method of claim 13, wherein at least partially filling the cavities in the transparent substrate with color filter material is performed before forming the layer of transparent electrically conductive material on the transparent spacers.

15. The method of claim 7, wherein forming the layer of transparent electrically conductive material on the transparent spacers further comprises:

applying a conductive resin to a region at least partially surrounding the cavities using ink jet printing.

16. An electrowetting display comprising:

a transparent substrate including transparent spacers surrounded by recessed regions corresponding to pixel regions;

a layer of electrically conductive material on the transparent spacers, wherein the electrically conductive material is transparent;

color filter material in the recessed regions; and a support plate covering the recessed regions and the transparent spacers, wherein:

the support plate includes pixel walls that partition a liquid into liquid portions that each correspond to pixels, and each of the liquid portions is in physical contact with the layer of electrically conductive material.

17. The electrowetting display of claim 16, wherein the electrically conductive material comprises indium tin oxide (ITO).

18. The electrowetting display of claim 16, further comprising:

a recessed border region along a periphery of the pixel regions; and seal material between the layer of electrically conductive material and the support plate, wherein the seal material is in the recessed border region.

19. The electrowetting display of claim 16, further comprising:

a second layer of electrically conductive material on the transparent substrate; and seal material between the second layer of electrically conductive material and the support plate, wherein the second layer of electrically conductive material is transparent.

20. The electrowetting display of claim 16, further comprising:

pixel walls between the transparent spacers and the support plate.

* * * * *